United States Patent [19]

Joyner

[11] 4,331,189
[45] May 25, 1982

[54] STOCK/SAUCE SKIMMER

[76] Inventor: Auvin H. Joyner, 43-39 39th Pl., Apt. 43, Sunnyside, N.Y. 11104

[21] Appl. No.: 195,800

[22] Filed: Oct. 10, 1980

[51] Int. Cl.³ .............................................. B67C 11/00
[52] U.S. Cl. ...................................... 141/343; 141/331; 210/474
[58] Field of Search ......................... 210/464–474, 210/513; 141/331, 343, 344

[56] References Cited

U.S. PATENT DOCUMENTS

| 170,093 | 11/1975 | London | 141/344 |
| 195,846 | 10/1977 | Schippert | 141/344 |
| 664,075 | 12/1900 | Berry | 141/344 |
| 945,362 | 1/1910 | Ashe | 141/331 |
| 3,865,023 | 2/1975 | Aglvorsen | 141/331 |
| 3,938,563 | 2/1976 | Gall | 141/344 |
| 4,031,032 | 6/1977 | Jablecki | 141/344 |
| 4,068,689 | 1/1978 | Krull | 141/331 |
| 4,145,294 | 3/1979 | Wilbur | 210/474 |
| 4,170,252 | 10/1979 | Peperson | 141/331 |
| 4,251,366 | 2/1981 | Simm et al. | 210/469 |

*Primary Examiner*—Theodore A. Granger
*Attorney, Agent, or Firm*—Richard L. Miller

[57] ABSTRACT

A stock/sauce skimmer device that separates oil from liquids having a ewer, a valve, a base and a collecting cup and when placed in storage the base becomes a lid and a sealing device is placed in the well of the lid and the spout of the collecting cup.

4 Claims, 5 Drawing Figures

STOCK/SAUCE SKIMMER

BACKGROUND OF THE INVENTION

This invention relates generally to liquids. More specifically it relates to a device that separates oils from liquids.

It is well known that when preparing cooked meat, such as roasts, chicken, meat balls, etc., it is desirable to obtain gravies or sauces from the meat. Oil or fat mixes into the gravy or sauce when cooking the meat. It then becomes difficult to remove the fat by hand, before using the liquid. This situation is therefore in need of an improvement.

SUMMARY OF THE INVENTION

A principle object of the present invention is to provide a stock-sauce skimmer which can be used easily by anyone.

Another object is to provide a stock/sauce skimmer which can be stored away conveniently.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

The Figures on the drawings are briefly described as follows.

DETAILED DESCRIPTION OF THE PREFERRED EMBODIMENT

Figure 1:
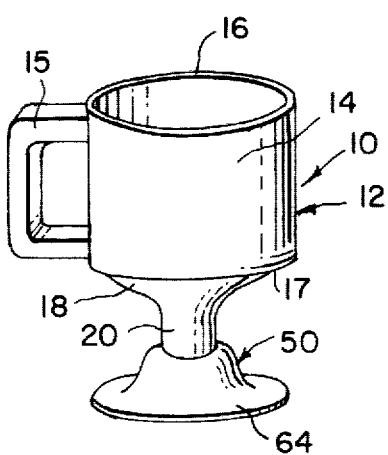
FIG. 1 is a perspective view of the invention ready for use.
Figure 2:
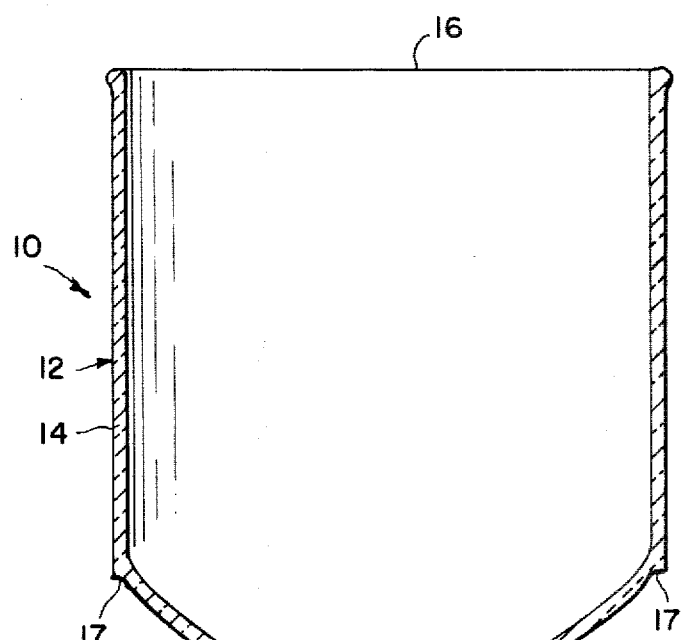
FIG. 2 is an exploded cross sectional view of the invention.
Figure 3:
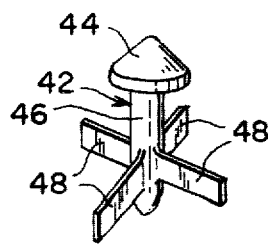
FIG. 3 is a perspective view of a valve element.

Referring now to FIGS. 1, 2 and 3 in greater detail, the reference numeral 10 represents a separator device assembly, wherein there is a two cup heat-resistant glass (Pyrex) ewer 12 having a large cylindrical portion 14 with an open top 16, a handle 15 formed onto portion 14, a hip shaped molded ring 17 around lower circumference of portion 14, a funnel shaped middle portion 18 connected to a bottom small tube 20, and an inward tapered bulge 22 formed on the inner wall 23 of small tube 20. The lower portion of the small tube 20 is seated in a circular trough 24 formed by a one-piece thimble or sleeve 26 made of concentric outer and inner walls 28, 30 and floor 32. The outer wall 28 has threads 33 and the inner wall 30 of sleeve 26 having a lip 34 turned inward at the top forming a peripheral flange 36 with a centered aperture 38.

The bulge 22 fits snugly over the seam of contact between flange 36 and inner wall 23 and is welded or cemented to form a moisture-proof bond between the sleeve 26 and small tube 20.

A valve or stopper element 42 (best seen in FIG. 3) has a replaceable mushroom shaped boilable plastic chokestopper 44 mounted on cast metal shaft 46 having four fin shaped supports 48 and is placed under the flange 36 to open and close aperture 38.

A one piece molded plastic base 50 is also provided and has an upper vertical well or aperture 52 having threads 54, and a lower vertical well or aperture 56 having a narrowing tapered wall 58 with four vertical slots 60. The bottom of well 56 has a drip-proof lip rim 62 and a cylindrical foot 64 having a right-angle undercut 66 around the circumference of foot 64. Threads 54 mate with threads 33 on sleeve 26 and fin supports 48 on valve 42 fit into slots 60.

The rim 62 prevents liquids from trailing outwards along the underside of foot 64, and the undercut 66 permits snug seating of base foot 64 within the rim of collecting cup 68.

Figure 4:
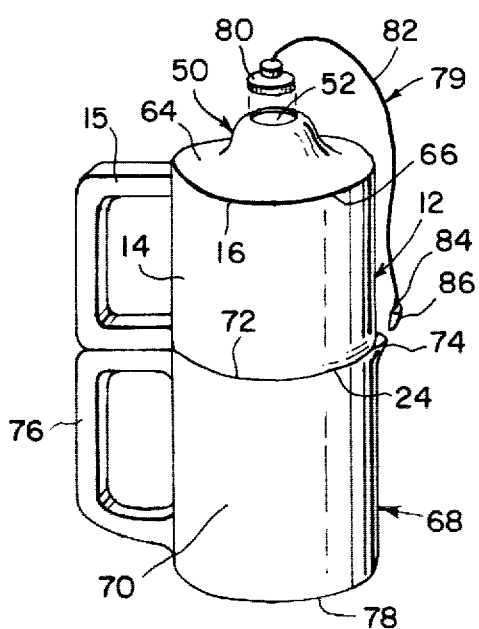
FIG. 4 is a perspective view of the invention on a collecting cup in storage.

FIG. 4 shows the collecting cup 68 which has a large cylindrical portion 70, with an open top 72 having spout 74, a handle 76 formed onto portion 70 opposite spout 74, and a closed bottom or floor 78.

In FIG. 4 the ring 17 of the ewer 12 is placed upon the open top 72 of the collecting cup 68 and the undercut 66 of base 50 is placed upon the top 16 of ewer 12, so that base 50 now acts as a lid when the unit is to be stored.

Figure 5:
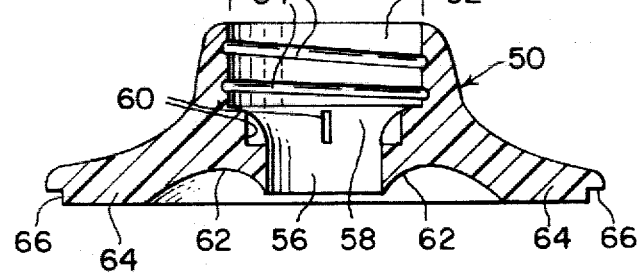
FIG. 5 is an enlarged view of the collecting cup spout cover.

A sealing device 79 has a small knobbed plastic stopper 80 that is attached to a thin lanyard 82 connects to an eyelet 84 on a plug 86. The stopper 80 is then placed into the well 52 of the lid 50 and the plug 86 (as best shown in FIG. 5) is placed into the spout 74 of the collecting cup 68 making it sanitary and completing the storage unit arrangment.

The operation of the stock/sauce skimmer is as follows:

Supports 48 of valve 42 are seated in slots 60 of tapered wall 58 in base 50. Pyrex cup 12 is screwed into aperture 52 of base 50 forming a free standing ewer. The undercut perimeter 66 of base foot 64 is mounted on open top 72 of collecting cup 68 and valve aperture 38 is closed by rotating ewer 12 (while holding base 50 stationary) until flange 36 is in firm contact with chokestopper 44. Pan or pot liquids are poured into ewer 12. When oil is well defined at the top of liquids, separation is accomplished by rotating ewer 12 to open position (about ½ turn) raising choke aperture 38 from closed contact with choke-stopper 44. Liquids flow out rapidly into collecting cup 68 and further control is effected by careful rotation of ewer 12 on stationary base 50. When the surface line between liquid and oil enters bottom tube 20, the ewer and collecting cup assembly 10 may be lifted to eye level for final optimal separation of oil from liquids. The assembly 10 is lifted by the collecting cup handle 76 with thumb pressure on top of base foot 64 to stabilize seating of undercut 66 within open top 72 of cup 68 and further rotation of ewer 12 will bring flange 36 into firm contact with choke-stopper 44 to close centered aperture 38 and stop liquid flow.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A stock/skimmer device comprising an ewer in which is stored liquids to be separated, said ewer having an elongated tubular extension at the lower base portion thereof through which the separated liquid may flow; a sleeve fixedly connected to the lower portion of said tubular extension such that the outer circumferential surface of said sleeve surrounds said tubular extension at the lower portion thereof, said outer circumferential surface of said sleeve having male threads thereon; a base having a central aperture formed therethrough for reception therein of said sleeve having male threads thereon, said central aperture being defined by a circumferential wall, said wall having formed therein female threads which mate with said male threads of said sleeve to thereby adjust the relative position of said sleeve and said tubular extension with respect to said base by relative rotation thereof; and a valve means positioned in said central aperture and in said sleeve; said sleeve having a central opening formed on the top surface thereof for the flow of liquids therethrough, said top surface being situated within said tubular extension; and said base comprises means for fixedly supporting said valve means therein such that said valve means is stationary with respect to said base; said valve means having a stopper which fits snugly in said central opening of said top surface of said sleeve when said sleeve is rotated to its downwardmost position in said base, and said stopper is spaced from said central opening in a desired and controlled relationship when said sleeve is rotated to an open position spaced from its downward most position in said base, whereby the separated liquid may be removed from said ewer at a controlled and varying rate, said separated liquid flowing through said tubular extension and through said central aperture of said base.

2. The stock/skimmer device according to claim 1, wherein said valve means comprises an elongated axial stem, and a plurality of support fins projecting radially outwardly from the lower end portion of said axial stem; and said means for fixedly supporting said valve means in said base comprises vertically-disposed plurality of slots in said circumferential wall of said base defining said central aperture, said plurality of support fins being positioned in said plurality of slots for anchoring said valve means therein.

3. The stock/skimmer device according to claim 2, wherein said stopper of said valve means is positioned at the top end portion of said axial stem, said stopper having a conical shape with the apex there of facing upwardly away from said axial stem toward said central opening; said stopper having a base portion having a greater diameter than the diameter of said central opening.

4. The stock/skimmer device according to claim 1, wherein said sleeve has a circular through formed therein between the outer and inner circumferential walls, said circular trough having a first end flush with the top surface of said sleeve, and a second end spaced from the bottom surface of said sleeve, said circular trough receiving therein in telescoping fashion said lower portion of said tubular extension, the lower end of said tubular extension being supported in said circular trough.

* * * * *